United States Patent
Lin et al.

(10) Patent No.: US 7,062,096 B2
(45) Date of Patent: Jun. 13, 2006

(54) APPARATUS AND METHOD FOR PERFORMING BITPLANE CODING WITH REORDERING IN A FINE GRANULARITY SCALABILITY CODING SYSTEM

(75) Inventors: Wanrong Lin, Plainsboro, NJ (US); Dennis Bushmitch, Somerset, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 735 days.

(21) Appl. No.: 10/206,368

(22) Filed: Jul. 29, 2002

(65) Prior Publication Data

US 2004/0017949 A1    Jan. 29, 2004

(51) Int. Cl.
*G06K 9/36* (2006.01)
*G06K 9/46* (2006.01)

(52) U.S. Cl. ............ 382/232; 382/233; 382/244; 358/426.13; 375/240.23

(58) Field of Classification Search .......... 382/232, 382/240, 244–247, 233; 341/59, 65, 67; 358/426.13, 426.16; 375/240.23
See application file for complete search history.

(56) References Cited

U.S. PATENT DOCUMENTS 6,771,828 B1 * 8/2004 Malvar .................. 382/240

6,804,402 B1 * 10/2004 Andrew .................. 382/240

FOREIGN PATENT DOCUMENTS

JP          2000013796 A   *  1/2000

OTHER PUBLICATIONS

Li ("Fine Granularity Scalability in PEG-4 for Streaming Video," IEEE Int'l Symposium on Circuits and Systems, May 28-31, 2000, pp. I299-I302).*
Marcellin et al. ("An Overview of JPEG-2000," IEEE Proc. Data Compression Conference, Mar. 28-30, 2000, pp. 523-541).*

* cited by examiner

*Primary Examiner*—Jingge Wu
*Assistant Examiner*—Yubin Hung
(74) *Attorney, Agent, or Firm*—Harness, Dickey & Pierce, PLC

(57) ABSTRACT

An apparatus and method for performing bitplane coding with reordering, that may be used in a Fine Granularity Scalability (FGS) system. The apparatus and method reorder coefficients each time after a bitplane is coded. By reordering, the apparatus and method separate the coefficients into two groups. When coding a bitplane, bits in the first group are copied into the bitstream, while the bits in the second group are subject to common run-length, VLC, or arithmetic coding. The apparatus and method may also be used with or in a conventional SNR, temporal and/or spatially scalable architectures, for example, as utilized within an MPEG-4 framework.

20 Claims, 12 Drawing Sheets

APPARATUS AND METHOD FOR PERFORMING BITPLANE CODING WITH REORDERING IN A FINE GRANULARITY SCALABILITY CODING SYSTEM

FIELD OF THE INVENTION

The present application relates to video coding, and more particularly to an apparatus and method for performing bitplane coding with reordering in a fine granularity scalability (FGS) coding system.

BACKGROUND OF THE INVENTION

Video coding has conventionally focused on improving video quality at a particular bit rate. With the rapid growth of network video applications, such as Internet streaming video, there is a desire to improve the video quality over a range of bit rates. Further, because of the wide variety of video servers and varying channel connections, there has been an interest in determining the bit rate at which the video quality should be optimized. Several approaches have been developed to overcome the problem of variations in transmission bandwidth.

Fine Granularity Scalability (FGS) was developed based on the traditional DCT-based video coder. With FGS, a single bitstream can produce continuously varying bit rates and qualities within a preset range in contrast to the discrete set bit rates and qualities. Because FGS has good compatibility with conventional DCT-based encoders and a good balance between scalability and reasonable complexity, it has been adopted by the MPEG-4 standard for streaming video applications.

The principal idea of FGS is bitplane coding. In a traditional (i.e., non-FGS encoder), quantized DCT coefficients are encoded with run-length coding followed by variable length coding (VLC), which is essentially a "coefficient by coefficient" encoding. In a FGS encoder, quantized DCT coefficients are first converted to their binary representations. All the bits with the same significance are grouped together and called a "bit plane". Starting with the most significant bit plane, the encoder codes the coefficients "plane by plane". Run-length coding and VLC are still used when encoding each bit plane. The FGS property comes from the fact that even when only a subset of the bit planes is transmitted/received/decoded, decodable video is still obtained, only at lower quality.

The use of FGS encoding and decoding for streaming video is described in ISO/IEC JTC1/SC 29/WG 11 N2502, International Organisation for Standardisation, "Information Technology-Generic Coding of Audio-Visual Objects—Part 2: Visual, ISO/IEC FDIS 14496-2, Final Draft International Standard," Atlantic City, October 1998, and ISO/IEC JTC1/SC 29/WG 11 N3518, International Organisation for Standardisation, "Information Technology-Generic Coding of Audio-Visual Objects—Part 2: Visual, Amendment 4: Streaming video profile, ISO/IEC 14496-2:1999/FPDAM 4, Final Proposed Draft Amendment (FPDAM 4)," Beijing, July 2000, the contents of which are incorporated by reference herein.

As described in an article by Li et al. entitled "Fine Granularity Scalability in MPEG-4 Streaming Video," Proceedings of the 2000 IEEE International Symposium on Circuit and Systems (ISCAS), Vol. 1, Geneva, 2000, the contents of which are incorporated by reference herein, an encoder generates a base layer and an enhancement layer that may be truncated to any amount of bits within a video object plane (VOP). The enhancement layer preferably improves the quality of the VOP. In other words, receiving more FGS enhancement bits typically results in better quality in the reconstructed video. Thus, by using FGS coding, a single bit rate need not to be provided, but rather a bit rate range can be provided to the FGS encoder. The FGS encoder preferably generates the base layer to meet the lower bound of the bit rate range and the enhancement layer to meet the upper bound of the bit rate range.

In a traditional communication system, the encoder compresses the input video signal into a bit rate that is less than, and usually close to, the channel capacity, and the decoder reconstructs the video signal using all the bits received from the channel. In such a model, two basic assumptions are typically made. The first assumption is that the encoder has knowledge regarding the channel capacity. The second assumption is that the decoder is able to decode all the bits received from the channel fast enough to reconstruct the video.

However, these two basic assumptions are not necessarily true in Internet streaming video applications. First, due to the server 12 used between the encoder 10 and the channel 14, as shown in FIG. 1, plus the varying channel capacity, the encoder 10 does not have knowledge regarding the channel capacity and does not know at which bit rate the video quality should be optimized. Secondly, many applications use a client/decoder 16 that shares the computational resources with other operations on the user terminal. The client/decoder 16 may not be able to decode all the bits received from the channel fast enough for reconstruction of the video signal. Therefore, a goal of video coding for Internet streaming video is to improve the video quality over a given bit range instead of at a given bit rate. The bitstream should be partially decodable at any bit rate within the bit rate range to reconstruct a video signal with improved quality at that bit rate.

Scalable video coding also has been a recent topic of interest. Once a given bit rate is chosen, a conventional, nonscalable coding technique tries to achieve optimal quality, however, if the channel bit rate is lower than the video coding bit rate, a "digital cutoff" phenomenon occurs and the received video quality becomes very poor. On the other hand, if the channel bit rate is higher than the video-coding bit rate, the received video quality is no better. In MPEG-2 and MPEG-4, several layered scalability techniques, namely, SNR scalability, temporal scalability, and spatial scalability, have been implemented. In such a layered scalable coding technique, a video sequence is coded into a base layer and an enhancement layer. The enhancement layer bitstream is similar to the base layer bitstream in the sense that it has to be either completely received and decoded or it does not enhance the video quality.

FIG. 2 illustrates an SNR scalability decoder 20 defined in MPEG-2 video-coding standard. The base-layer bitstream is decoded by the base layer variable-length decoder (VLD) 22 first. The inverse quantizer 24 in the base layer produces reconstructed DCT coefficients. The enhanced bitstream is decoded by the VLD 26 in the enhancement layer and the enhancement residues of the DCT coefficients are produced by the inverse quantizer 28 in the enhancement layer. A higher accuracy DCT coefficient is obtained by adding the base-layer reconstructed DCT coefficient and the enhancement-layer DCT residue in adder 30. The DCT coefficients with a higher accuracy are provided to the inverse DCT (IDCT) unit 32 to produce reconstructed image domain residues that are to be added to the motion-compensated block from the previous frame in adder 34.

Temporal scalability is a technique to code a video sequence into two layers at the same spatial resolution, but different frame rates. The base layer is coded at a lower frame rate. The enhancement layer provides the missing frames to form a video with a higher frame rate. Coding efficiency of temporal scalability is high and very close to nonscalable coding. FIG. 3 illustrates temporal scalability. Only P-type prediction is used in the base layer. The enhancement-layer prediction can be either P-type or B-type from the base layer or P-type from the enhancement layer.

Spatial scalability is a technique to code a video sequence into two layers at the same frame rate, but different spatial resolutions. The base layer is coded at a lower spatial resolution. The reconstructed base-layer picture is up-sampled to form the prediction for the high-resolution picture in the enhancement layer. FIG. 4 illustrates a single-loop spatial scalability decoder 40. An advantage of single-loop spatial scalability is its simplicity. If the spatial resolution of the base layer is the same as that of the enhancement layer, i.e., the up-sampling factor being 1, the spatial scalability decoder 40 can be considered as an SNR scalability decoder also. Unlike the SNR scalability decoder 20 in MPEG-2, the spatial scalability decoder 40 does not include the enhancement-layer information into the prediction loop. Therefore, if the corresponding encoder does not include the enhancement layer information into the prediction loop either, base-layer drift does not exist. Coding efficiency of the enhanced video using such an "open-loop" scalable coding method suffers from the fact that the enhancement information of the previous frame is not used in the prediction for the current frame.

The spatial scalability decoders defined in MPEG-2 and MPEG-4 use two prediction loops, one in the base layer and the other in the enhancement layer. The MPEG-2 spatial scalable decoder uses as prediction a weighted combination of an up-sampled reconstructed frame from the base layer and the previously reconstructed frame in the enhancement layer, while the MPEG-4 spatial scalable decoder allows a "bi-directional" prediction using up-sampled reconstructed frame from the base layer as the "backward reference" and the previously reconstructed frame in the enhancement layer as the "forward reference". Currently, FGS in the MPEG-4 standard does not support spatial scalability.

In conventional DCT coding, the quantized DCT coefficients are coded using run-level coding. The number of consecutive zeros before a nonzero DCT coefficient is called a "level". If a so-called "2-D" VLC table is used, the (run, level) symbol is coded and a separate "EOB" symbol is used to signal the end of the DCT block. If a "3-D" VLC table is used, the (run, level, eob) symbol is coded, where "eob" signals the end of the DCT block.

The major difference between a bitplane coding method and a run-level coding method is that the bitplane coding method considers each quantized DCT coefficient as a binary number of several bits instead of a decimal integer of a certain value. For each 8×8 DCT block, the 64 absolute values are zigzag ordered into an array. A bitplane of the block is defined as an array of 64 bits, taken on from each absolute value of the DCT coefficients at the same significant position. For each bitplane of each block, (RUN, EOP) symbols are formed and variable-length coded to produce the output bitstream. Starting from the most significant bitplane (MSB-plane), 2-D symbols are formed of two components: 1) a number of consecutive zeros before a 1 (RUN) and 2) whether there are any ones left on this bitplane, i.e., end-of-plane (EOP). If a bitplane contains all zeros, a special symbol, ALL-ZERO, is needed to represent it.

The following example illustrates bitplane coding. It is assumed that the absolute values and the sign bits after zigzag ordering are given as follows:

10, 0, 6, 0, 0, 3, 0, 2, 2, 0, 0, 2, 0, 0, 1, 0, . . . , 0, 0    (absolute value)
0, x, 1, x, x, 1, x, 0, 0, x, x, 1, x, x, 0, x, . . . , x, x    (sign bits).

The maximum value in this block is found to be 10 and the number of bits to represent 10 in the binary format (1010) is four. Therefore, four bitplanes are used in forming the (RUN, EOP) symbols. Writing every value in the binary format, the four bitplanes are as follows:

1, 0, 0, 0, 0, 0, 0, 0, 0, 0, 0, 0, 0, 0, 0, 0, . . . , 0, 0    (MSB)
0, 0, 1, 0, 0, 0, 0, 0, 0, 0, 0, 0, 0, 0, 0, 0, . . . , 0, 0    (MSB-1)
1, 0, 1, 0, 0, 1, 0, 1, 1, 0, 0, 1, 0, 0, 0, 0, . . . , 0, 0    (MSB-2)
0, 0, 0, 0, 0, 1, 0, 0, 0, 0, 0, 0, 0, 0, 1, 0, . . . , 0, 0    (MSB-3).

Converting the four bitplanes into (RUN, EOP) symbols, results in:

(0, 1)    (MSB)
(2, 1)    (MSB-1)
(0, 0), (1, 0), (2, 0), (1, 0), (0, 0), (2, 1)    (MSB-2)
(5, 0), (8, 1)    (MSB-3).

Therefore, ten (RUN, EOP) symbols are formed in this example. These symbols are coded using variable-length code together with the sign bits, as shown below.

VLC(0, 1),0    (MSB)
VLC(2, 1),1    (MSB-1)
VLC(0, 0), VLC(1,0), VLC(2,0), 1, VLC(1,0), 0, VLC(0,0), 0, VLC(2,1),1    (MSB-2)
VLC(5, 0), VLC(8,1), 0    (MSB-3).

Each sign bit is put into the bitstream only once right after the VLC code that contains the MSB of the nonzero absolute value associated with the sign bit. For example, no sign bit follows the second VLC code of the MSB-2 plane because the sign bit has been coded after the VLC code in the MSB-1 plane.

However, conventional bitplane coding suffers from the following:

Run-length coding is not efficient when the run is short.

Encountering "1" in a bitplane makes a corresponding coefficient "significant" for all subsequent bitplane coding. If a coefficient is significant in a certain bitplane, the bit of that coefficient in that bitplane has approximately equal probability of being 1 or 0.

When coding a certain bitplane, the probability of an insignificant coefficient becoming a significant coefficient ("flip probability") is much lower than 0.5.

The "significant" bits will interfere with the run-length coding because they have different statistical properties from the others.

SUMMARY OF THE INVENTION

The present invention relates to the field of data compression and variable length media coding. In particular, the present invention is directed to a method and apparatus for performing bitplane coding with reordering, in particular in a Fine Granularity Scalability (FGS) system. The method and apparatus for performing bitplane coding with reordering may be further utilized to code the bitplanes, for example, in MPEG-4 FGS video encoding. The method and apparatus reorder the DCT coefficients each time after a bitplane is coded. By reordering, the method and apparatus separate the coefficients into two groups. The first group includes the coefficients whose most significant binary "1" bits are in the previous coded bitplanes. The other coefficients constitute the second group. When coding a bitplane, bits in the first group are copied into the bitstream, while the bits in the second group are subject to common run-length, VLC, or arithmetic coding.

An advantage of the method and apparatus is they enable an MPEG-4 framework to attain spatial scalability using FGS, which is advantageous because FGS provides fine degrees of spatial quality control upon network streaming/decoding. A second advantage is earlier access to the more important coefficients as a result of the reordering. Although the method and apparatus of the present invention are described in the context of an MPEG-4 FGS framework, they may also be applied to other media encoding algorithms that utilize bitplane coding. In order to provide improved flexibility in quality and bitrate selection, the present invention incorporates spatial, temporal and SNR scalabilities into the FGS facility of a coding scheme.

The present invention may also be used with or in a conventional SNR, temporal and/or spatially scalable architecture, for example, as utilized within an MPEG-4 framework. This architecture improves the coding efficiency of the enhancement layer by 5% to 14% compared to the conventional architectures adopted in MPEG-4. This architecture also improves flexibility in quality and bitrate selection. This architecture is described, for example, in an MPEG-4 FGS framework, but may also be applied to other media encoding algorithms that utilize bitplane coding.

BRIEF DESCRIPTION OF THE DRAWINGS

These and other features of the present invention will be better understood by reference to the following detailed description, taken in conjunction with the accompanying drawings, wherein.

DETAILED DESCRIPTION OF EXEMPLARY EMBODIMENTS

As described above, the basic idea of FGS is to code a video sequence into a base layer and an enhancement layer. The base layer uses nonscalable coding to reach the lower bound of the bit-rate range. The enhancement layer codes the difference between the original picture and the reconstructed picture using bitplane coding of the DCT coefficients. In the context of the present invention, any conventional hardware and/or technique may be used to encode (and/or) decode the base layer, as long as the result is a base layer that approximately represents the original data.

Figure 1:
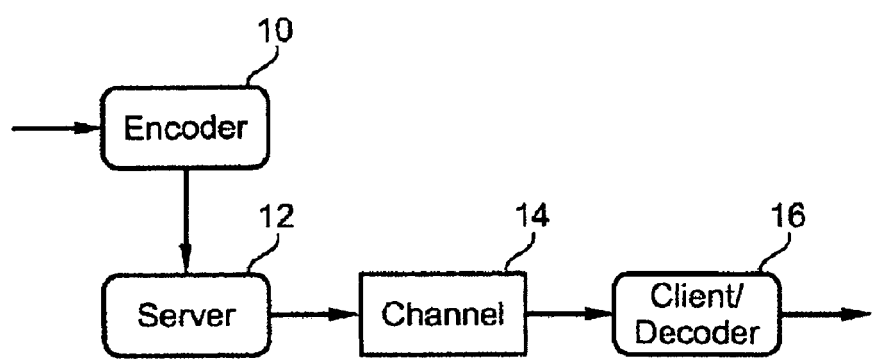
FIG. 1 illustrates a conventional system for processing Internet streaming video.
Figure 2:
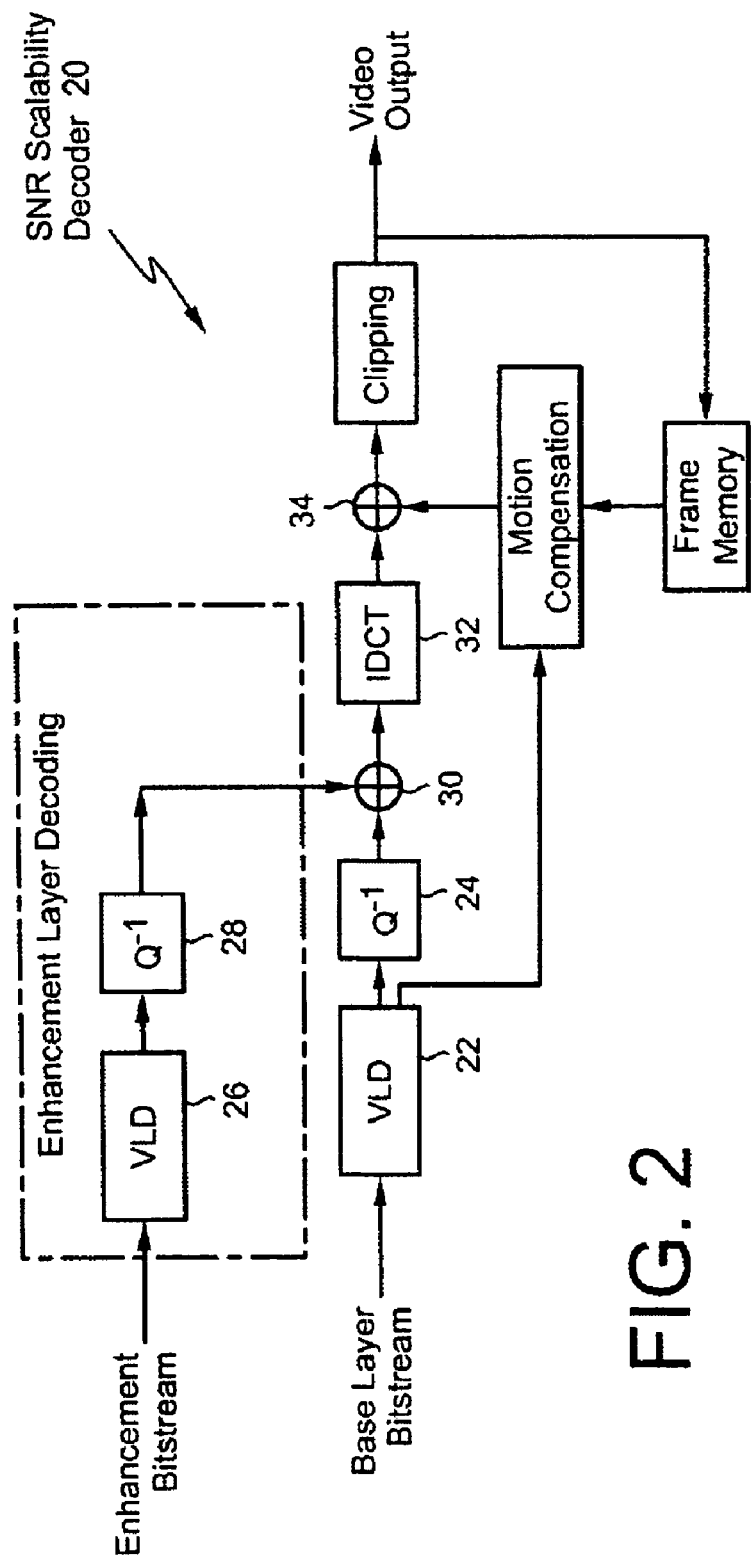
FIG. 2 illustrates a conventional signal-to-noise (SNR) scalability decoder for MPEG-2.
Figure 3:
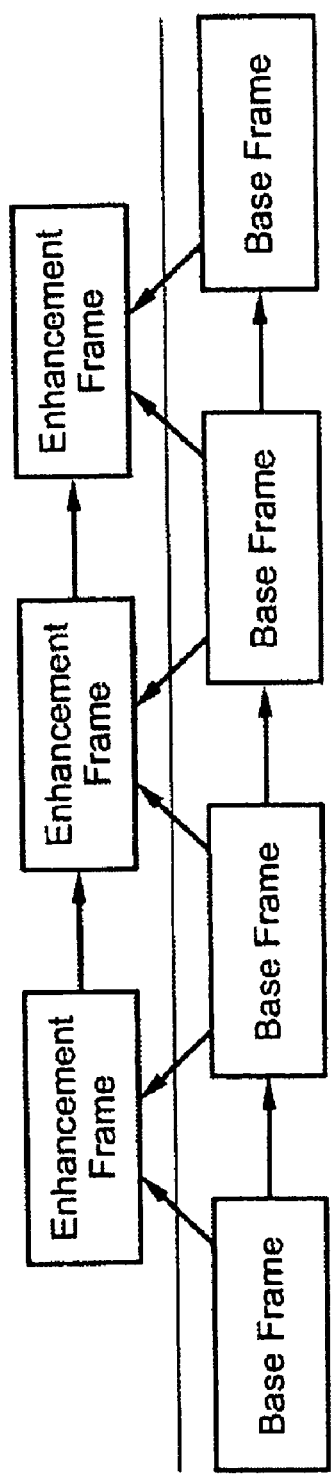
FIG. 3 illustrates conventional temporal scalability.
Figure 4:
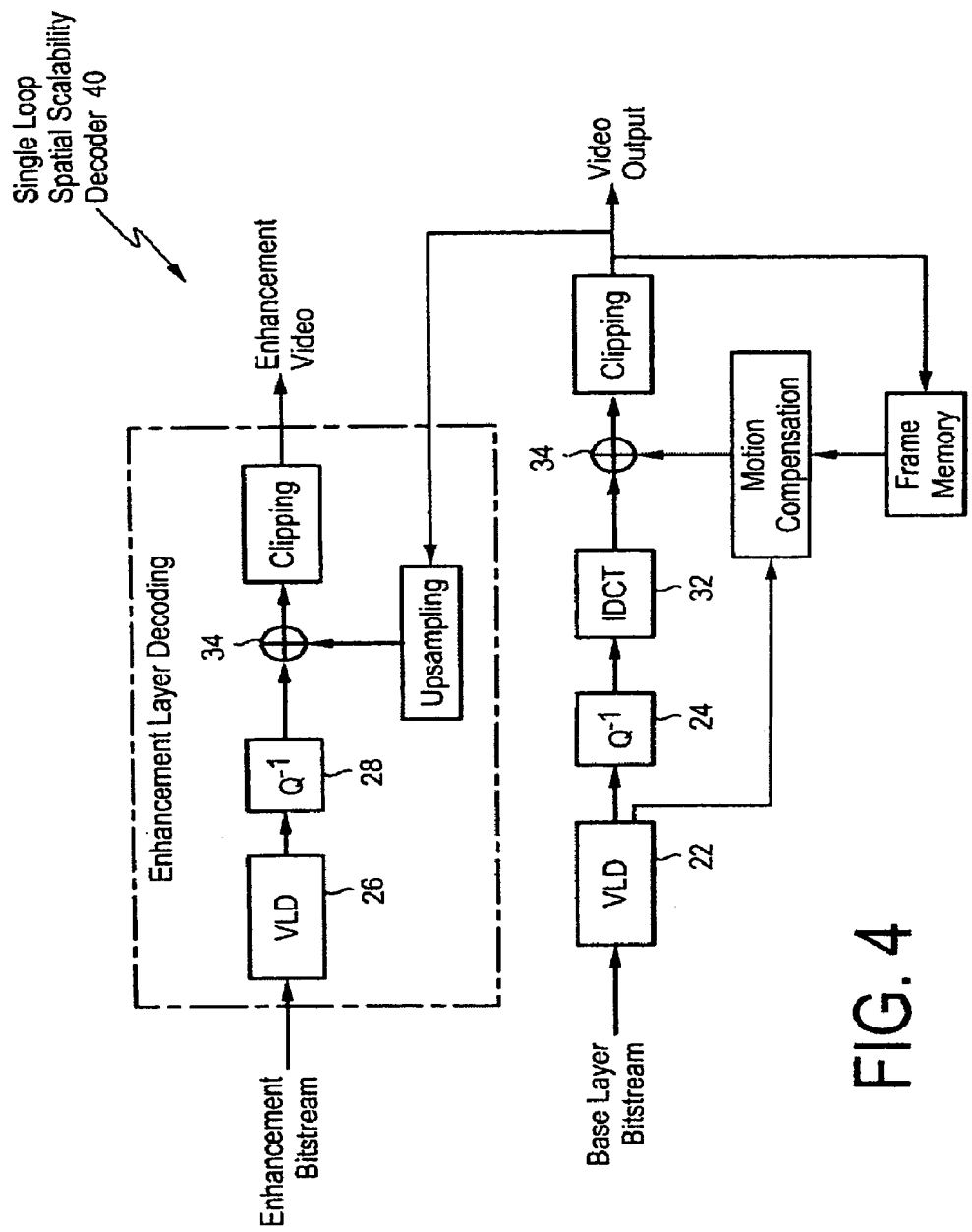
FIG. 4 illustrates a conventional single-loop spatial scalability decoder.
Figure 5:
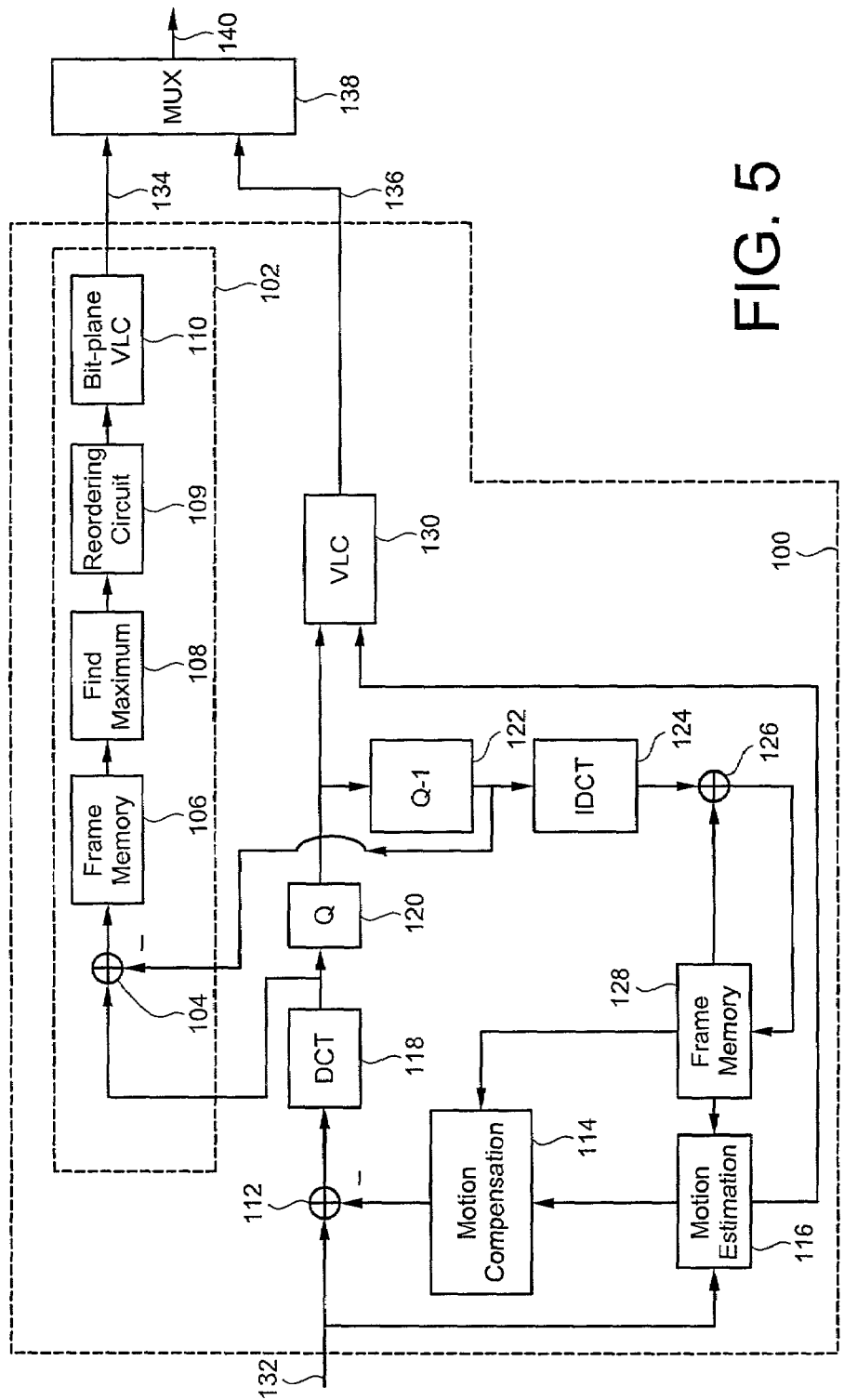
FIG. 5 illustrates an FGS encoder in accordance with an exemplary embodiment of the present invention.

FIG. 5 illustrates an exemplary FGS encoder 100 and a multiplexer 138 in accordance with an exemplary embodiment of the present invention. The FGS encoder 100 receives an input video 132, and generates a base layer bitstream 136 and an enhancement bitstream 134. The base layer bitstream 136 may be generated using any conventional hybrid encoding, such as MPEG-4 encoding. The generation of the base layer bitstream using hybrid encoding is well known to those skilled in the art. As described above, the base layer bitstream 136 may be generated by any hardware and/or software as long as the base layer bitstream 136 approximately represents the input video 132.

The input video 132 may be in Standard Definition television (SDTV) and/or High Definition television (HDTV) formats. Further, the input video 132 may be in one or more of analog and/or digital video formats, which may include, but are not limited to, both component (e.g., $YP_RP_B$, $YC_RC_B$ and RGB) and composite video, e.g., NTSC, PAL or SECAM format video, or Y/C (S-video) compatible formats. The input video 132 may be compatible with Digital Visual Interface (DVI) standard or may be in any other customized display formats.

The base layer bitstream 136 may comprise MPEG-4 video streams that are compatible with MPEG-4 Advanced Simple Profile or MPEG-2 Main Profile video streams, as well as any other standard digital cable and satellite video/audio streams.

To meet processing demands, the FGS encoder 100 and the multiplexer 138 may be implemented on one or more integrated circuit chips. In other implementations, the FGS encoder 100 and/or the multiplexer 138 may be implemented using software (e.g., microprocessor-based), hardware (e.g., ASIC), firmware (e.g., FPGA, PROM, etc.) or any combination of software, hardware and firmware.

The FGS encoder 100 includes an FGS enhancement encoder 102. The FGS enhancement encoder 102 preferably generates the enhancement bitstream 134 through FGS enhancement encoding. As illustrated in FIG. 5, the FGS enhancement encoder 102 receives original discrete cosine transform (DCT) coefficients from a DCT module 118 and reconstructed (inverse quantized) DCT coefficients from an inverse quantizer ($IQTZ/Q^{-1}$) module 122, and uses them to generate the enhancement bitstream 134.

Each reconstructed DCT coefficient preferably is subtracted from the corresponding original DCT coefficient in a subtractor 104 to generate a residue. The residues preferably are stored in a frame memory 106. After obtaining all the DCT residues of a VOP, a maximum absolute value of the residues preferably is found in a find maximum module 108, and the maximum number of bitplanes for the VOP preferably is determined using the maximum absolute value of the residue.

Bitplanes are formed in accordance with the determined maximum number of bitplanes and reordered in reordering circuit 109 (a detailed description of which is provided below) and variable length encoded in a bitplane variable length encoder 110 to generate the enhancement bitstream 134. The structure of the FGS encoder 100 and FGS enhancement encoder 102, except for the reordering circuit 109 and methods of encoding base layers and FGS layers are well known to those skilled in the art.

As described above, the FGS enhancement bitstream 134 may be sliced and packetized at transmission time to satisfy the varying user bit rates. This characteristic makes FGS suitable for applications where transmission bandwidth varies. To this end, bitplane coding of quantized DCT coefficients is used to encode the quantized DCT coefficients one bitplane at a time.

The MPEG-4 standard uses FGS to achieve a finer trade-off between quality and bit rate. With FGS, a single bitstream can produce continuously varying bit rates and qualities within a preset range in contrast to the discrete bit rates and qualities.

Figure 6:
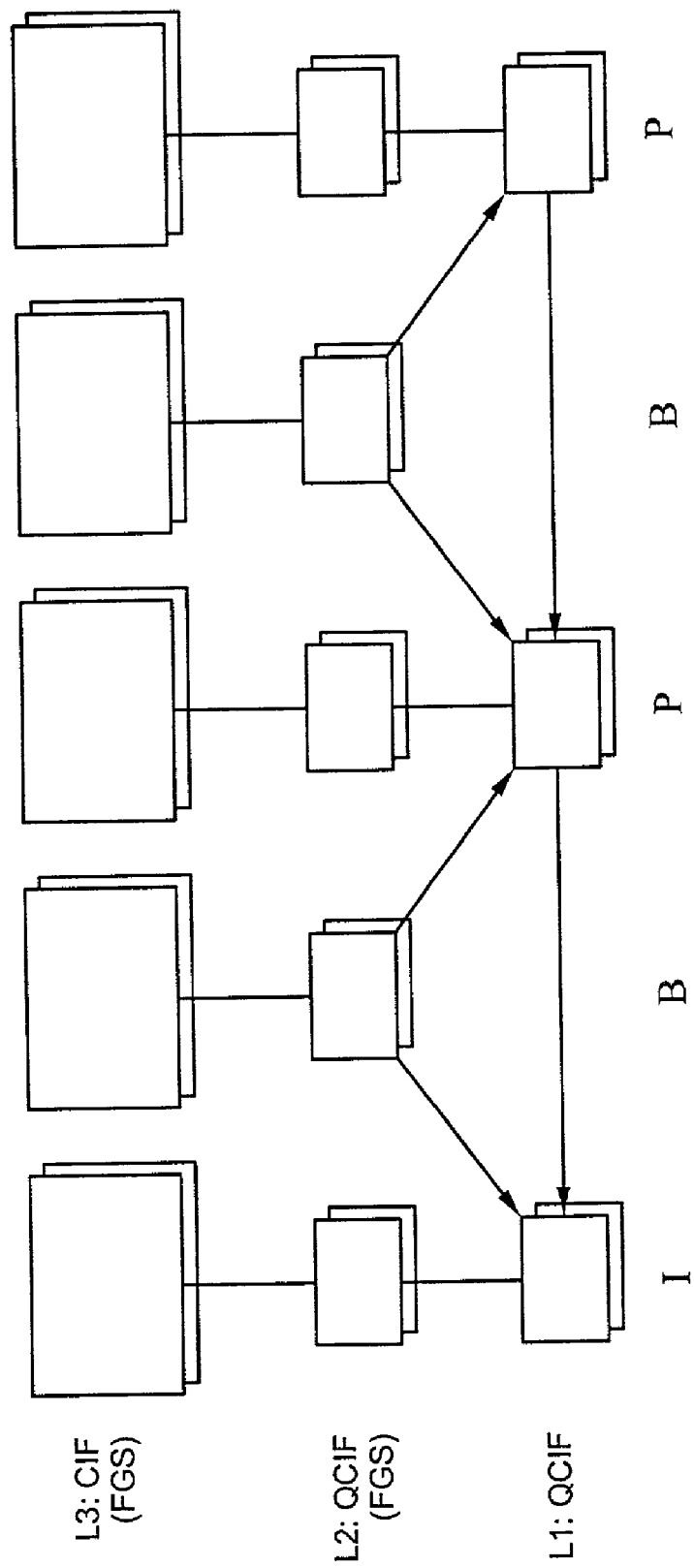
FIG. 6 illustrates an exemplary coding structure in accordance with an exemplary embodiment of the present invention.

In bitplane VLC 110, the quantized DCT coefficients are first converted to their binary representations. All the bits with the same significance are grouped together and called a "bitplane". Starting with the most significant bitplane, the encoder codes the coefficients "plane by plane". Run-length coding and VLC are still used when encoding each bitplane. FIG. 6 illustrates an exemplary coding structure in accordance with the present invention. As illustrated, the presence of layer L1 (the base layer) is mandatory. The base layer is substantially the same as in any other conventional hybrid DCT-based encoder. An exemplary video frame size in the base layer is QCIF (176*144), an exemplary frame rate is 15 f/s (assuming an original frame rate of 30 f/s). Layer 2 (L2) is the quality and temporal enhancement of Layer 1 and is coded with FGS. Layer 3 is the spatial enhancement of layer 2. An example is CIF size (352*288) and coded with FGS based on the prediction from the spatial interpolation of Layer 2.

The meaning of the term "layer" for L2 and L3 is slightly different from that for layer L1 because of the FGS nature of layers L2 and L3. Layer L1 is mandatory in video reconstruction process. However, complete L2 or L3 layers are not required to reconstruct the video. A server could discard some bits in the L2 and L3 layers to meet transmission and storage requirements.

As illustrated in FIG. 6, B frames are completely independent of each other and can be discarded at will. Therefore, if network conditions do not allow for the transmission of the full quality video, one can choose to either discard the B pictures and maintain a high spatial quality, or to sacrifice the spatial quality for each frame but maintain the full temporal quality. Therefore, the coding described is very flexible. Flexibility is valuable in streaming applications, which are subject to dynamic network conditions.

The bitplane VLC 110 performs bitplane coding, which is a feature of FGS. Conventional bitplane coding includes run-length coding of a binary sequence followed by variable length coding (VLC). Since the only non-zero value is one, the run-length symbol is defined as (Run, EOP). Run is the number of consecutive zeros before a one, EOP (end of plane) is a binary variable signaling whether there are still non-zero values after this symbol in the same bitplane. In addition to providing FGS, bitplane coding is more efficient than conventional run-length coding of DCT coefficients.

The bitplane VLC 110 performs bitplane coding with reordering as performed by the reordering circuit 109. The reordering is described in detail below. The basic idea of reordering is to separate the bits of significant and insignificant coefficients.

Figure 7:
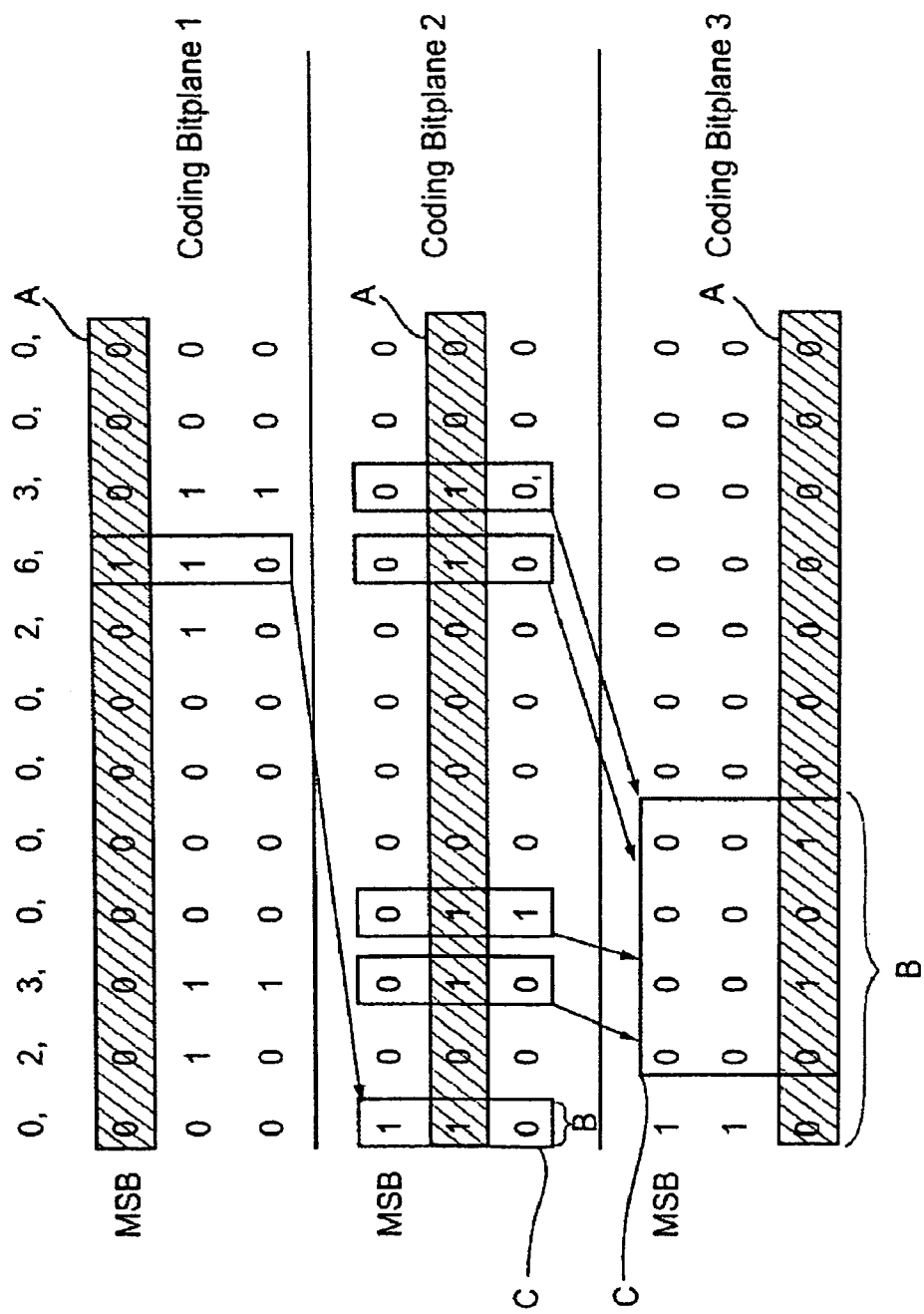
FIG. 7 illustrates an example of bitplane coding with reordering in accordance with an exemplary embodiment of the present invention.

FIG. 7 describes bitplane coding with reordering of the string 0, 2, 3, 0, 0, 0, 0, 2, 6, 3, 0, 0, in more detail. Area A indicates the bitplane being coded. The coding of bitplane 1 is conventional. The reordering occurs during coding of bitplane 2. In the coding of bitplane 2, all the newly found significant coefficients in bitplane 1 are moved to the beginning position (indicated by area C). The bits in area B are not coded at all (these are called "raw bits") and are simply copied into the compressed bitstream. The remaining bits are coded in the conventional manner. This process is repeated for each bitplane.

The coding result for the example of FIG. 7, using the bitplane coding with reordering of the present invention is set forth below:

| | |
|---|---|
| Bitplane 1 | (0,1) |
| Bitplane 2 | 1, (0,0), (0,0), (0,0), (0,1) |
| Bitplane 3 | 0, 0, 1, 0, 1, (all zero symbol). |

The result is six symbols and six raw bits. It is noted that a symbol must be selected for the "all zero" condition.

Figure 8:
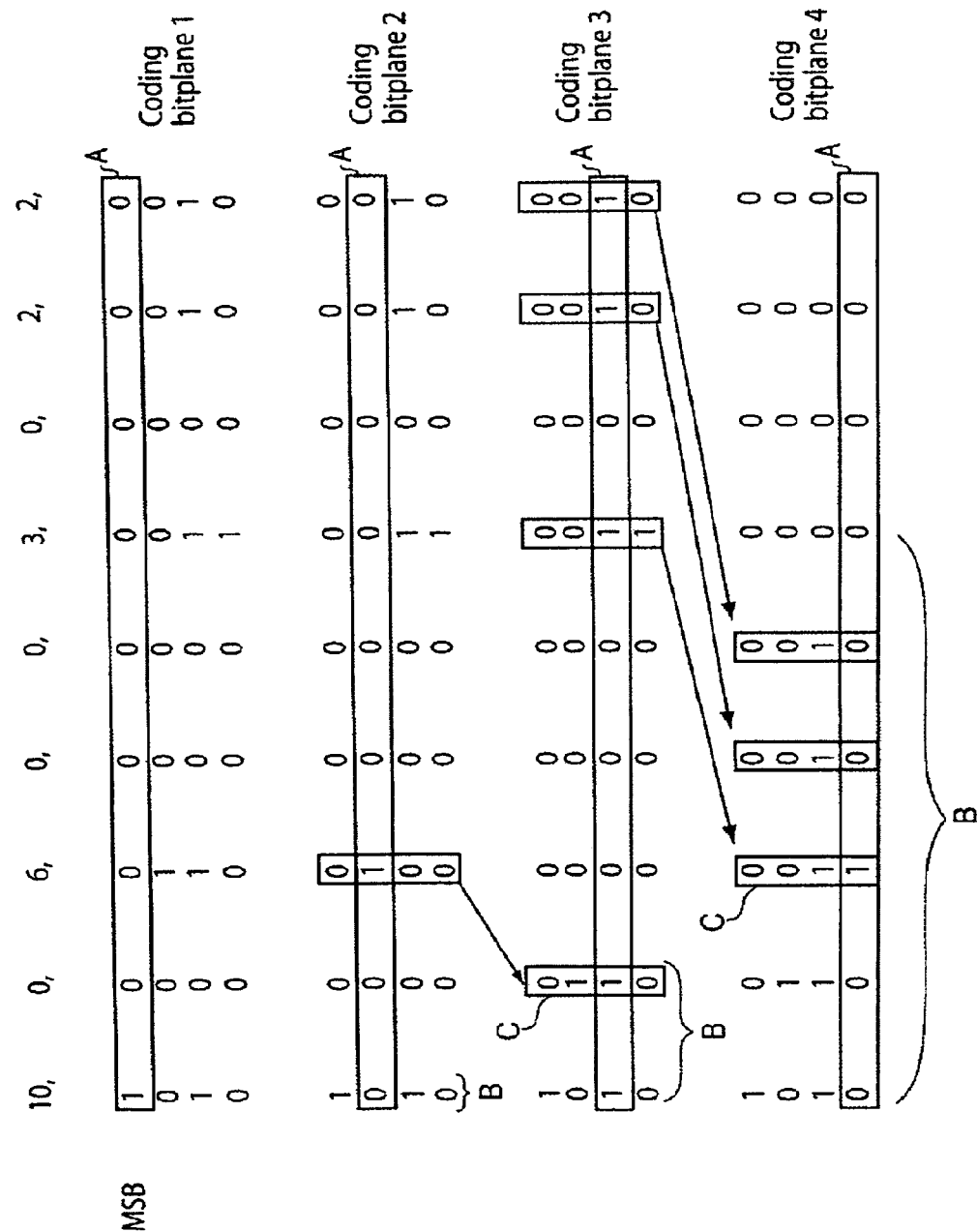
FIG. 8 illustrates another example of bitplane coding with reordering in accordance with an exemplary embodiment of the present invention.

Application of the bitplane coding with reordering of the present invention to a portion of the previous example, 10, 0, 6, 0, 0, 3, 0, 2, 2, is illustrated in FIG. 8 and results in the following:

| | |
|---|---|
| Bitplane 1 | (0,1) |
| Bitplane 2 | 0, (0,1) |
| Bitplane 3 | 1, 1, (0,0), (0,0), (0,1) |
| Bitplane 4 | 0, 0, 1, 0, 1, (all zero symbol). |

Using bitplane coding with reordering in accordance with the present invention, bits of significant and insignificant are separated. Since the flip rate is much lower than 0.5, long runs of zeros are more likely to occur. Since the raw bits have an approximately equal probability of being 1 or 0, simply copying them into the bitstream does not lose any coding gain. As a result, overall coding efficiency is improved. Additionally, the distribution of the run values will be more uniform across different bitplanes, which makes a single VLC table for all bitplanes possible, while conventional bitplane coding requires four VLC tables, one for each bitplane.

Figure 9:
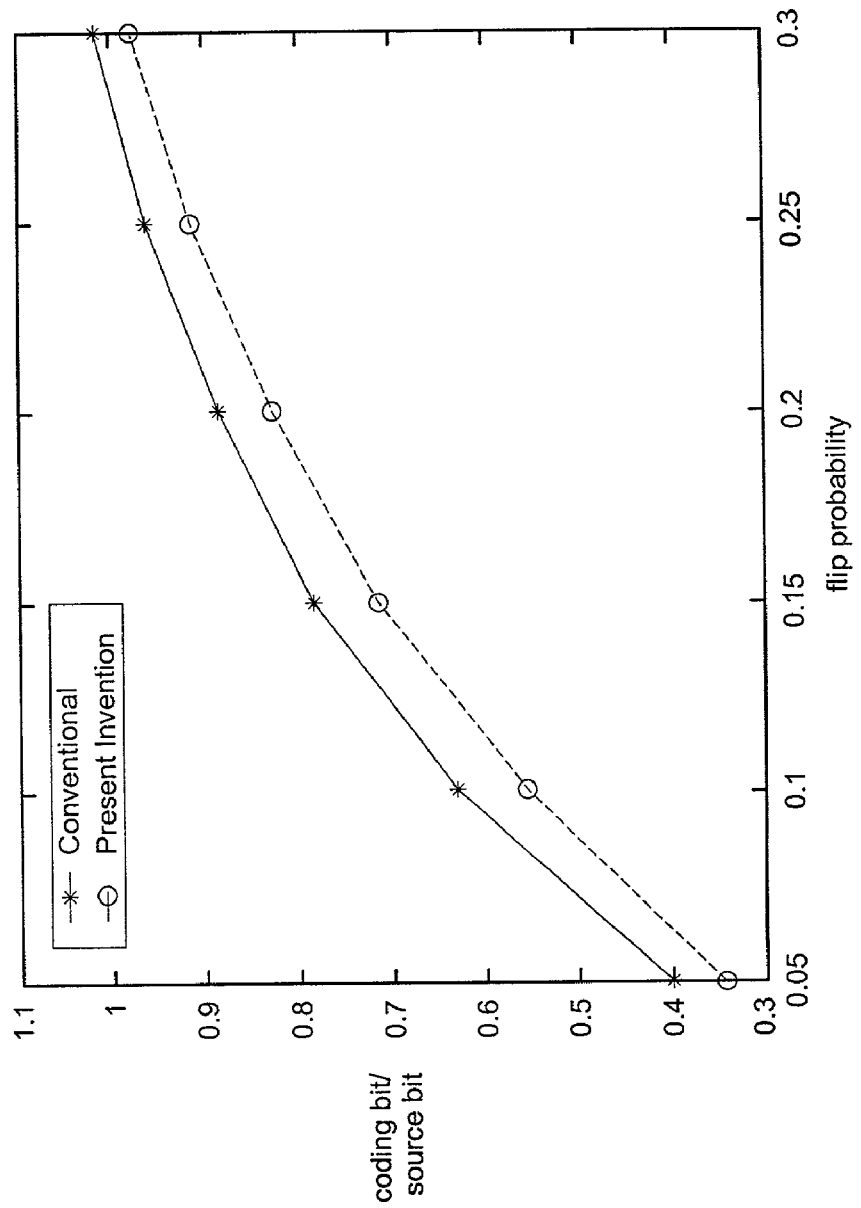
FIGS. 9 and 10 illustrate improvements obtained with bitplane coding with reordering in accordance with an exemplary embodiment of the present invention.
Figure 10:
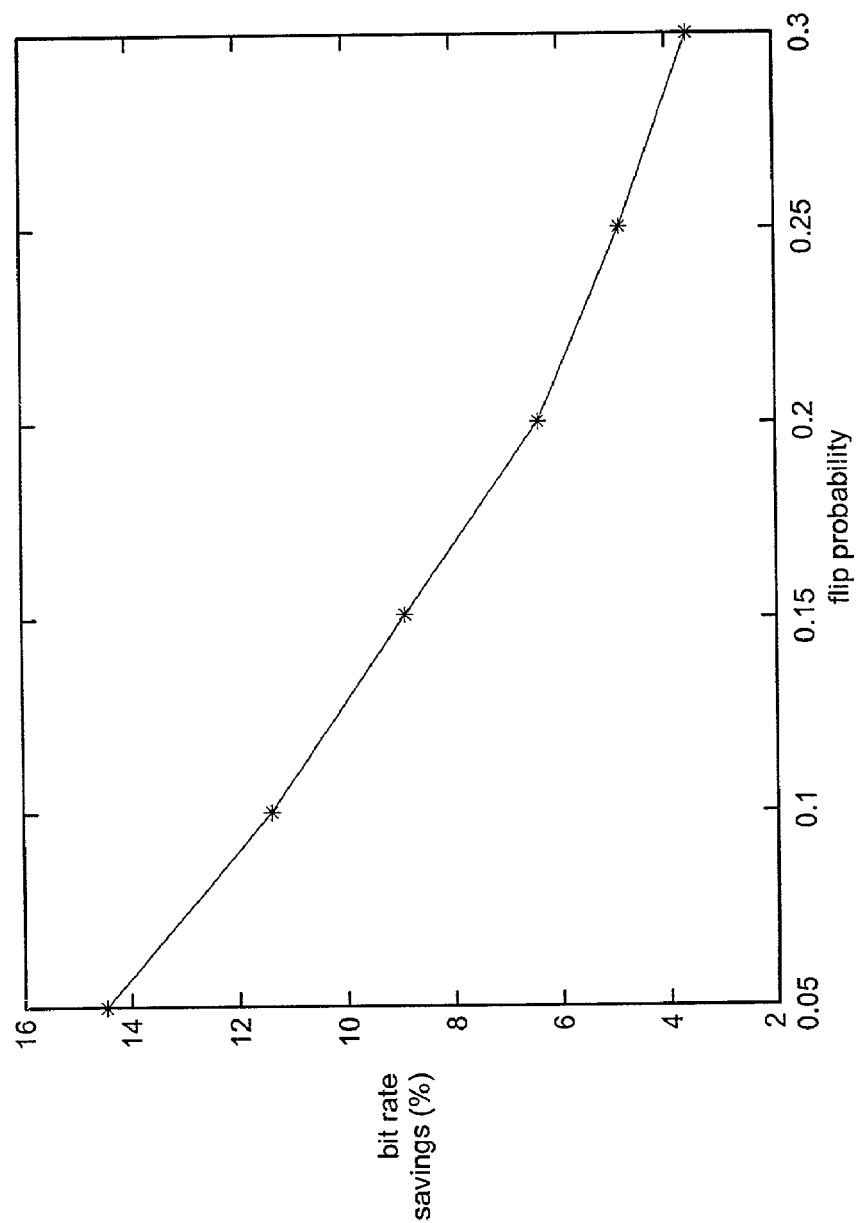

In a simulation test, blocks of 3 bitplanes each including 64 bits were randomly generated based on the model described above (i.e.: At each bitplane, the probability of an insignificant coefficient becoming significant is $p<<0.5$ (flip probability); The bits of a significant coefficient has an equal probability of being 1 and 0). Both the conventional bitplane coding and bitplane coding with reordering in accordance with the present invention are used to code the same blocks and the entropies are compared. FIGS. 9 and 10 demonstrate the results. In FIG. 9, the x axis is the flip probability, while the y axis is the average number of coded bits for each source bit (bit per bit). FIG. 10 shows the percentage of bit rate savings from the bitplane coding with reordering of the present invention. The savings are particularly significant when the flip probability is low.

Returning to FIG. 5, the enhancement bitstream 134 and the base layer bitstream 136 preferably are packetized and multiplexed in multiplexer 138, which provides a multiplexed stream 140. The multiplexed stream 140, for example, may be a transport stream such as an MPEG-4 transport stream.

The multiplexed stream 140 is provided to a network to be received by one or more FGS decoders over variable bandwidth channels, which may include any combination of the Internet, Intranets, T1 lines, LANs, MANs, WANs, DSL, Cable, satellite link, Bluetooth, home networking, and the like using various different communications protocols, such as, for example, TCP/IP and UDP/IP. The multiplexer 140 preferably also inserts decoding time stamps (DTSs) and presentation time stamps (PTSs) into packet headers for synchronization of the decoding/presentation with a system clock. The DTSs indicate the decoding time of VOPs contained in the packets, while the PTSs indicate the presentation time of the decoded and reconstructed VOPs.

Figure 11:
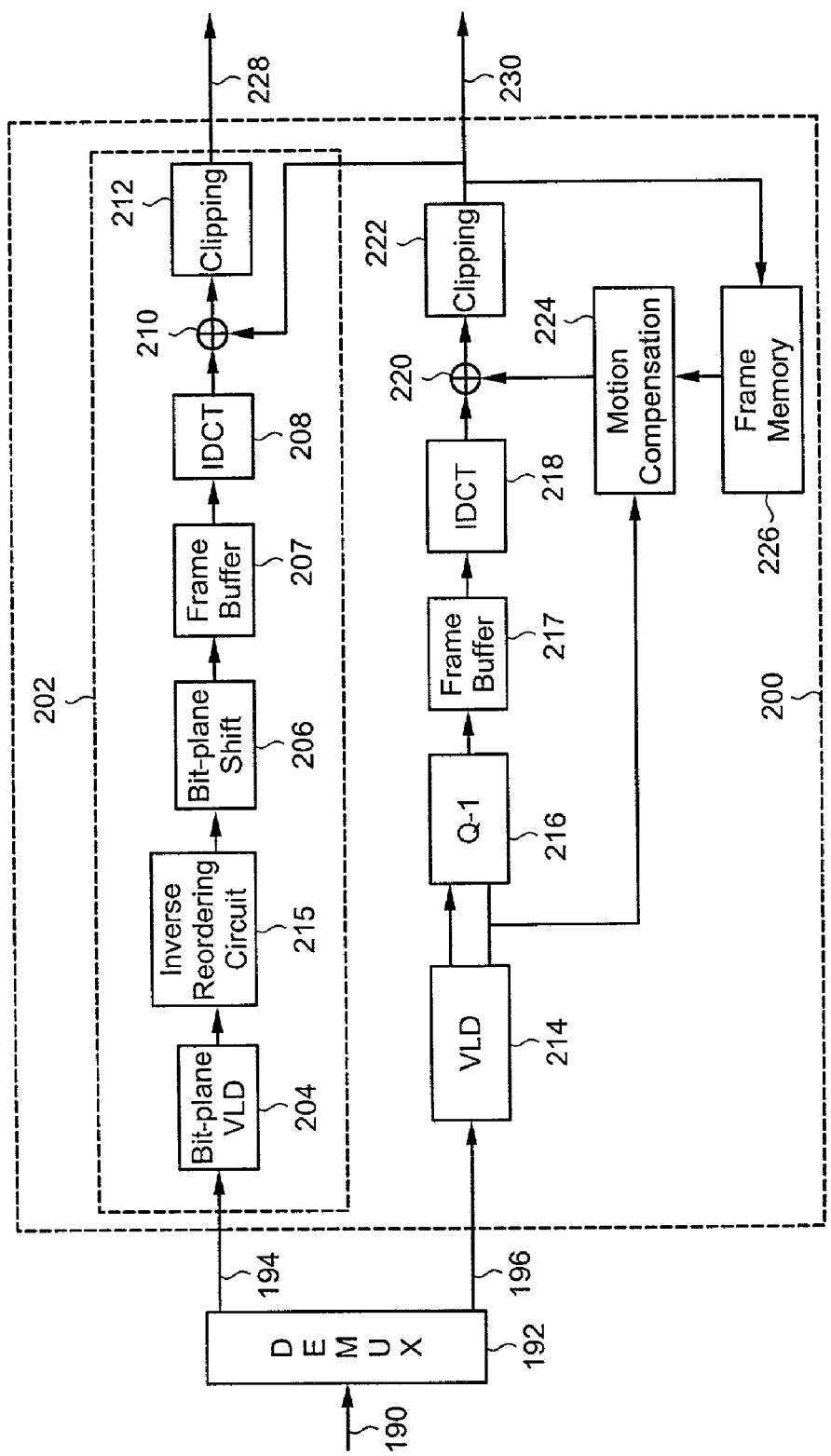
FIG. 11 illustrates an FGS decoder in accordance with an exemplary embodiment of the present invention.

FIG. 11 illustrates an exemplary FGS decoder 200 coupled to a demultiplexer 192. The demultiplexer 192 receives a multiplexed bitstream 190. The multiplexed bitstream 190 may contain all or portions of the base layer bitstream 136 and enhancement bitstream 134 provided by an FGS encoder, such as, for example the FGS encoder 100 of FIG. 5, depending on conditions of the variable bandwidth channel over which the multiplexed bitstream is transmitted and received. For example, if only a limited bandwidth is available, the received multiplexed bitstream may include only the base layer bitstream 136 and none or a portion of the enhancement layer bitstream 134. For another example, if the amount of available bandwidth varies during the transmission of a particular video stream, the amount of the received enhancement bitstreams would vary accordingly.

The FGS decoder 200 and the demultiplexer 192 may be implemented on one or more integrated circuit chips. Alternatively, the FGS decoder 200 and/or the demultiplexer 192 may be implemented using software (e.g., microprocessor-based), hardware (e.g., ASIC), firmware (e.g., FPGA, PROM, etc.) or any combination of software, hardware and firmware.

The demultiplexer 192 demultiplexes the multiplexed bitstream 190, extracts DTSs and PTSs from the packets, and preferably provides an enhancement bitstream 194 and a base layer bitstream 196 to the FGS decoder 200. The FGS decoder 200 preferably provides enhancement layer video 228. The FGS decoder 200 may also provide base layer video as an optional output 230. If only the base layer bitstream is available, for example, due to bandwidth limitation, the FGS decoder 200 may only output the base layer video 230 and not the enhancement video 228.

The number of bit planes received for the enhancement layer may depend on channel bandwidth. For example, as more bandwidth is available in the variable bandwidth channel, an increased number of bit planes may be received. In cases when only a small amount of bandwidth is available, only the base layer may be received. The structure of the FGS decoder 200, and methods of decoding the base layer bitstreams and the enhancement bitstreams are well known to those skilled in the art.

The FGS decoder 200 includes a variable length decoder (VLD) 214, an inverse quantizer (IQTZ) 216, a frame buffer 217, an inverse discrete cosine transform block (IDCT) 218, a motion compensation block 224, a frame memory 226, a summer 220 and a clipping unit 222. The VLD 214 receives the base layer bitstream 196. The VLD 214, for example, may be a Huffman decoder.

The base layer bitstream 196 may comprise MPEG-4 video streams that are compatible with Main Profile at Main Level (MP@ML), Main Profile at High Level (MP@HL), and 4:2:2 Profile at Main Level (4:2:2@ML), including ATSC (Advanced Television Systems Committee) HDTV (High Definition television) video streams, as well as any other standard digital cable and satellite video/audio streams.

The regeneration of the base layer bitstream 196 is well known to those skilled in the art. As described above, the base layer bitstream 196 may be generated by any hardware and/or software as long as the base layer bitstream 196 approximately represents the output video 230.

The VLD 214 sends encoded picture (macroblocks) to the IQTZ 216, which is inverse quantized and stored in the frame buffer 217 as DCT coefficients. The DCT coefficients are then sent to the IDCT 218 for inverse discrete cosine transform. The VLD 214 extracts motion vector information from the base layer bitstream and sends it to a motion compensation block 224 for reconstruction of motion vectors and pixel prediction.

The motion compensation block 224 uses the reconstructed motion vectors and stored pictures (fields/frames) from a frame memory 226 to predict pixels and provide them to a summer 220. The summer 220 sums the predicted pixels and the decoded picture from the IDCT 218 to reconstruct the picture that was encoded by the FGS encoder. The reconstructed picture is then stored in a frame memory 226 after being clipped (e.g., to a value range of 0 to 255) by the clipping unit 222, and may be provided as the base layer video 230. The reconstructed picture may also be used as a forward picture and/or backward picture for decoding of other pictures.

The reconstructed pictures may be in Standard Definition television (SDTV) and/or High Definition television (HDTV) formats. Further, the reconstructed pictures may be converted to and/or displayed in one or more of analog and/or digital video formats, which may include, but are not limited to, both component (e.g., $YP_RP_B$, $YC_RC_B$ and RGB) and composite video, e.g., NTSC, PAL or SECAM format video, or Y/C (S-video) compatible formats. The reconstructed pictures may also be converted to be displayed on a Digital Visual Interface (DVI) compatible monitor or converted to be in any other customized display formats.

The FGS decoder 200 may also include an FGS enhancement decoder 202. To reconstruct the enhanced VOP, the enhancement bitstream is first decoded using a bitplane (BP) variable length decoder (VLD) 204 and an inverse reordering circuit 215 in the FGS enhancement decoder 202. The bitplane (BP) variable length decoder (VLD) 204 and the inverse reordering circuit 215 perform the inverse operations of the bitplane VLC 110 and the reordering circuit 109. The decoded block-BPs preferably are used to reconstruct DCT coefficients in the DCT domain. The reconstructed DCT coefficients are then right-shifted in a bitplane shifter 206 based on the frequency weighting and selective enhancement shifting factors. The bitplane shifter 206 preferably generates as an output the DCT coefficients of the image domain residues.

The DCT coefficients preferably are first stored in a frame buffer 207. The frame buffer preferably has a capacity to store DCT coefficients for one or more VOPs of the enhancement layer. DCT coefficients for the base layer preferably are stored in the frame buffer 217. The frame buffer 217 preferably has a capacity to store the DCT coefficients for one or more VOPs of the base layer. The frame buffer 207 and the frame buffer 217 may occupy contiguous or non-contiguous memory spaces. The frame buffer 207 and the frame buffer 217 may even occupy the identical memory space.

The DCT coefficients of the enhancement layer VOPs preferably are provided to an inverse discrete cosine transform (IDCT) module 208. The IDCT module 208 preferably outputs the image domain residues, and provides them to a summer 210. The summer 210 also receives the reconstructed and clipped base-layer pixels. The summer 210 preferably adds the image domain residues to the reconstructed and clipped base-layer pixels to reconstruct the enhanced VOP. The reconstructed enhanced VOP pixels preferably are limited into the value range between 0 and 255 by a clipping unit 212 in the FGS enhancement decoder 202 to generate the enhanced video 228.

Figure 12:
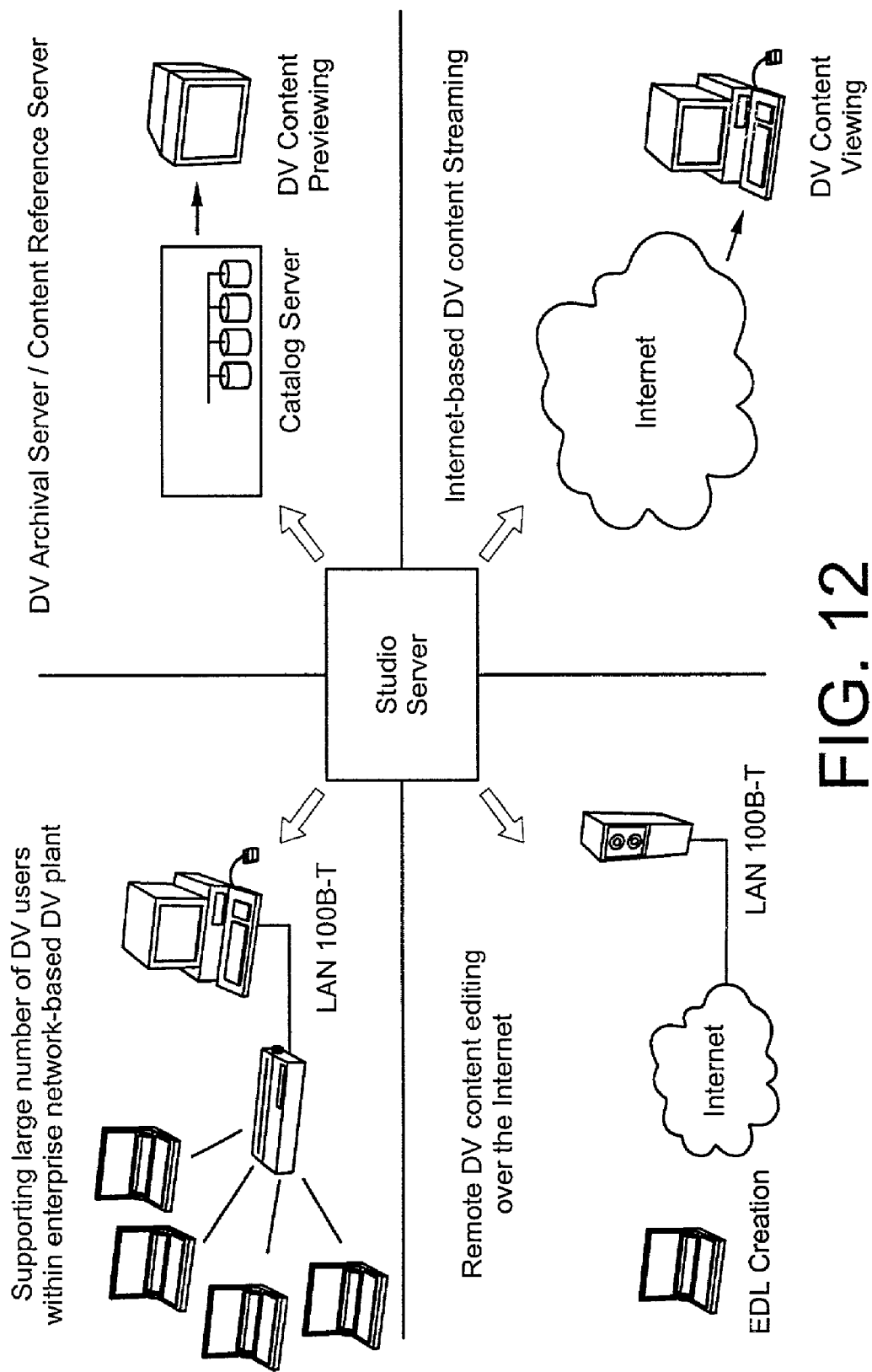
FIG. 12 illustrates an application of the present invention in accordance with an exemplary embodiment.

An exemplary application of the present invention is discussed in conjunction with FIG. 12. A fundamental operation in a TV studio is the editing of digital video (DV) footage sent back by journalists. Conventionally, the video contents are fed into a video server and editors download them to their local disks and work from there. Due to the high bit rates, a large usage of various resources is required. First, congestion may occur in the studio networks if a considerable number of editors are connected to the video server. Second the downloading takes a lot of time. Third, a very large local disk space is needed for each editor. Furthermore, it is impossible for an editor to work from a remote site through the internet connection.

A studio usually keeps a large tape archive of its footages for possible later use. It is very desirable to have a video archive server from which video footages can be searched for and previewed. Again, the high bit rates and the large amount of data prohibit storing all the videos into the server.

A solution to the problems above can be achieved by creating a companion low bit rate (LBR) stream for every piece of material when it is fed into the studio server. The editors would only need to download the low bit rate frame accurate version of the footage and work from that. In the editing process editing decision lists (EDLs) are created to record all the editing decisions the editors have made. After receiving the EDLs from the editors, the server (or a separate machine which has dedicated high speed connection with the server) can create the final broadcasting version based on the original footage. That way it is also possible for an editor to work remotely via the internet.

When the footage is being archived, the companion LBR streams could be stored onto a catalog server. With text descriptions, or content-based automatic indexing tools, the archives can be searched and previewed with high efficiency. This means shorter inquiry and downloading time.

One of the additional benefits of this approach is that no extra encoding effort is needed for Internet-based streaming. With a little packaging effort on the server, the LBR streams can be directly used in internet streaming applications.

To ensure the LBR stream can be used in various transmissions and storage conditions, it is very desirable to have scalability and a relatively large dynamic range of bit rate and quality. Also, it will greatly enhance the flexibility if the combination (bit rate, quality) is not just limited to several selections.

What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

We claim:

1. A bitplane encoder, comprising:
   a reordering module for reordering a plurality of bit-planes beginning with a most significant bit (MSB) to produce reordered coefficients and non-reordered coefficients, which make up a reordered bitplane; and
   a bitplane encoding module for receiving the reordered bitplane and for encoding the reordered bitplane to produce a compressed output stream, said bitplane encoding module encoding the reordered bitplane using at least one of run-length and variable-length encoding, wherein the compressed output stream includes encoded data from the non-reordered coefficients and raw data from the reordered coefficients.

2. The bitplane encoder of claim 1, wherein said bitplane encoder is implemented in hardware and/or software.

3. A fine granularity scalability (FGS) enhancement encoder including the bitplane encoder of claim 1.

4. The FGS enhancement encoder of claim 3, wherein the FGS enhancement encoder performs at least one of signal-to-noise ratio, temporal, or spatial scalability enhancement.

5. A fine granularity scalability (FGS) encoder including the bitplane encoder of claim 1.

6. The FGS encoder of claim 5, wherein the FGS encoder performs at least one of signal-to-noise ratio, temporal, or spatial scalability enhancement.

7. A studio including the bitplane encoder of claim 1, said studio for performing at least one of browsing, archiving, cataloging, transcoding from a first format to a second format, editing, and streaming.

8. A method of bitplane encoding, comprising:
   reordering a plurality of bit-planes beginning with a most significant bit (MSB) to produce reordered coefficients and non-reordered coefficients, which make up a reordered bitplane; and
   encoding the reordered bitplane using at least one of run-length and variable-length encoding to produce a compressed output stream, wherein the compressed output stream includes encoded data from the non-reordered coefficients and raw data from the reordered coefficients.

9. A bitplane decoding module for receiving inverse reordered coefficients and non-inverse reordered coefficients and for decoding the non-inverse reordered coefficients and not the inverse reordered coefficients to produce an output stream.

10. The bitplane decoding module of claim 9, wherein said inverse reordering module is implemented in hardware and/or software.

11. A bitplane decoder, comprising:
    an inverse reordering module for receiving an encoded, reordered bitplane and performing inverse reordering on the encoded, reordered bitplane beginning with a most significant bit (MSB) to produce inverse reordered coefficients and non-inverse reordered coefficients; and
    a bitplane decoding module for receiving the inverse reordered coefficients and the non-inverse reordered coefficients and for decoding the non-inverse reordered coefficients and not the inverse reordered coefficients to produce an output stream.

12. The bitplane decoder of claim 11, said bitplane decoding module decoding the non-inverse reordered coefficients using at least one of run-length and variable-length decoding, wherein the output stream includes decoded data from the non-inverse reordered coefficients and raw data from the inverse reordered coefficients.

13. The bitplane decoder of claim 11, wherein said bitplane decoder is implemented in hardware and/or software.

14. A fine granularity scalability (FGS) decoder including the bitplane decoder of claim 11.

15. The FGS decoder of claim 14, wherein the FGS decoder performs at least one of signal-to-noise ratio, temporal, or spatial scalability enhancement.

16. A studio including the bitplane decoder of claim 11, said studio for performing at least one of browsing, archiving, cataloging, transcoding from a first format to a second format, editing, and streaming.

17. A method of decoding, comprising:
receiving inverse reordered coefficients and non-inverse reordered coefficients and for decoding the non-inverse reordered coefficients and not the inverse reordered coefficients to produce an output stream.

18. The method of claim 17, wherein said decoding method is implemented in hardware and/or software.

19. A method of decoding, comprising:
receiving an encoded, reordered bitplane and inverse reordering the encoded, reordered bitplane beginning with a most significant bit (MSB) to produce inverse reordered coefficients and non-inverse reordered coefficients; and
decoding the non-inverse reordered coefficients and not the inverse reordered coefficients to produce an output stream.

20. The method of claim 19, said decoding step decoding the non-inverse reordered coefficients using at least one of run-length and variable-length decoding, wherein the output stream includes decoded data from the non-inverse reordered coefficients and raw data from the inverse reordered coefficients.

* * * * *